(12) United States Patent
Hinzman

(10) Patent No.: US 8,950,621 B2
(45) Date of Patent: Feb. 10, 2015

(54) COOKING UTENSIL WITH ROTATABLE HANDLE

(71) Applicant: Charles Hinzman, Boynton Beach, FL (US)

(72) Inventor: Charles Hinzman, Boynton Beach, FL (US)

(*) Notice: Subject to any disclaimer, the term of this patent is extended or adjusted under 35 U.S.C. 154(b) by 0 days.

(21) Appl. No.: 13/782,667

(22) Filed: Mar. 1, 2013

(65) Prior Publication Data

US 2013/0228581 A1 Sep. 5, 2013

Related U.S. Application Data

(60) Provisional application No. 61/606,044, filed on Mar. 2, 2012.

(51) Int. Cl.
| | |
|---|---|
| B65D 25/28 | (2006.01) |
| A47J 27/00 | (2006.01) |
| A47J 45/06 | (2006.01) |
| A47J 36/00 | (2006.01) |

(52) U.S. Cl.
CPC ............. *A47J 27/002* (2013.01); *A47J 45/06* (2013.01)
USPC .......... 220/573.1; 220/753; 220/757; 220/764

(58) Field of Classification Search
USPC ................. 220/573.1, 753, 757, 764, 23.89
See application file for complete search history.

(56) References Cited

U.S. PATENT DOCUMENTS

| | | | | |
|---|---|---|---|---|
| 967,799 | A * | 8/1910 | MacBeth | 220/753 |
| 2,172,524 | A * | 9/1939 | Stevens | 220/776 |
| 2,915,001 | A * | 12/1959 | Montgomery | 99/339 |
| 5,097,106 | A | 3/1992 | Arai et al. | |
| 5,166,485 | A | 11/1992 | Arai et al. | |
| 5,823,385 | A * | 10/1998 | Cautereels | 220/762 |
| 6,173,860 | B1 * | 1/2001 | Lamers | 220/759 |
| 6,220,477 | B1 * | 4/2001 | Schneider | 220/763 |
| 6,334,386 | B1 | 1/2002 | Iacchetti | |
| 6,685,048 | B1 | 2/2004 | Ranzoni et al. | |
| 7,090,094 | B2 | 8/2006 | Wade et al. | |
| 7,762,182 | B2 | 7/2010 | Garziera | |

(Continued)

FOREIGN PATENT DOCUMENTS

| | | |
|---|---|---|
| EP | 0 247 229 A1 | 12/1987 |
| WO | 99/05948 A1 | 2/1999 |

OTHER PUBLICATIONS

HTTP://WWW.THEKITCHN.COM, "Folding Handles, Stacking Pots: Bialetti Cookware Concept International Home & Housewares Show," Apartment Therapy The Kitchn, www.thekitchn.com/thekitchn/cookware-tools/folding-handles-staching-pots-bialetti-cookware-concept-international-home-housewares-show-2011-141142, International Home & Housewares Show 2011, USA.

*Primary Examiner* — Mickey Yu
*Assistant Examiner* — Niki Eloshway
(74) *Attorney, Agent, or Firm* — Duane Morris LLP; J. Rodman Steele, Jr.; Gregory M. Lefkowitz

(57) ABSTRACT

A cooking utensil with a reconfigurable handle is described. The cooking utensil can include a cooking body having an outer wall; a mounting bracket attached to the outer wall; and a handle rotatably coupled to the mounting bracket. The handle can be coupled to the mounting bracket in a manner that the handle can be rotated between a cooking position where the handle extends in a radial direction from the outer wall and a storage position where the handle follows at least a portion of said outer wall.

13 Claims, 17 Drawing Sheets

(56) References Cited

U.S. PATENT DOCUMENTS

| | | |
|---|---|---|
| 8,011,530 B2* | 9/2011 | Kutsch et al. .............. 220/762 |
| 2008/0179211 A1* | 7/2008 | Kutsch et al. .............. 206/514 |
| 2009/0065509 A1 | 3/2009 | Schuler |
| 2009/0183565 A1* | 7/2009 | Shamoon et al. .............. 73/426 |
| 2009/0218355 A1* | 9/2009 | Chameroy et al. .......... 220/573.1 |
| 2011/0247504 A1 | 10/2011 | Zangrande et al. |

* cited by examiner

US 8,950,621 B2

COOKING UTENSIL WITH ROTATABLE HANDLE

CROSS REFERENCE TO RELATED APPLICATIONS

This application claims priority to U.S. Provisional Application No. 61/606,044 filed Mar. 2, 2012, the entirety of which is incorporated herein by reference.

BACKGROUND

Cooking utensils, such as pots and pans, with radially extending handles are known. Some patents disclose cooking utensils that convert to a storage position by having a handle that splits in half with each half pivoting against a round or rectangular body. See, e.g., U.S. Pat. Nos. 6,334,386 & 6,685,048. Another patent discloses a pot with a unitary handle that can be turned to an inoperative position over the pot. See European Patent Application 0 247 229. Yet another patent discloses a pan with a handle that rotates and then folds into a storage position in two distinct motions. However, there is still room for improvements to cooking utensils.

SUMMARY OF THE INVENTION

A cooking utensil with a reconfigurable handle is described. The cooking utensil can include a cooking body having an outer wall; a mounting bracket attached to the outer wall; and a handle rotatably coupled to the mounting bracket. The handle can be coupled to the mounting bracket in a manner that the handle can be rotated between a cooking position when the handle extends in a radial direction from the outer wall and a storage position where the handle follows at least a portion of the outer wall.

These and other features, objects and advantages of the present invention will become more apparent to one skilled in the art from the following description and claims when read in light of the accompanying drawings.

DETAILED DESCRIPTION

A cooking utensil, e.g., a pot or pan, with a rotatable handle is described. The handle can rotate between a cooking position and a storage position. In the storage position, the cooking utensil takes up substantially less space than conventional cooking utensils, which have a handle extending radially from the center of the cooking utensil. A particular benefit of the cooking utensil is the unique, single action motion between the cooking position and the storage position. Unlike prior art devices, the unique, single action motion provides a highly robust and durable handle movement, while the elegant release mechanism blends into the handle design easily while preventing accidental pivoting of the handle during cooking or storage.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

As used herein, the "horizontal plane" refers to a plane parallel to the plane on which the bottom of the cooking utensil rests. For a wok or other round bottomed cooking vessel, the horizontal plane refers to a plane parallel to the plane that is orthogonal to the bottom of the wok.

Figure 7A:
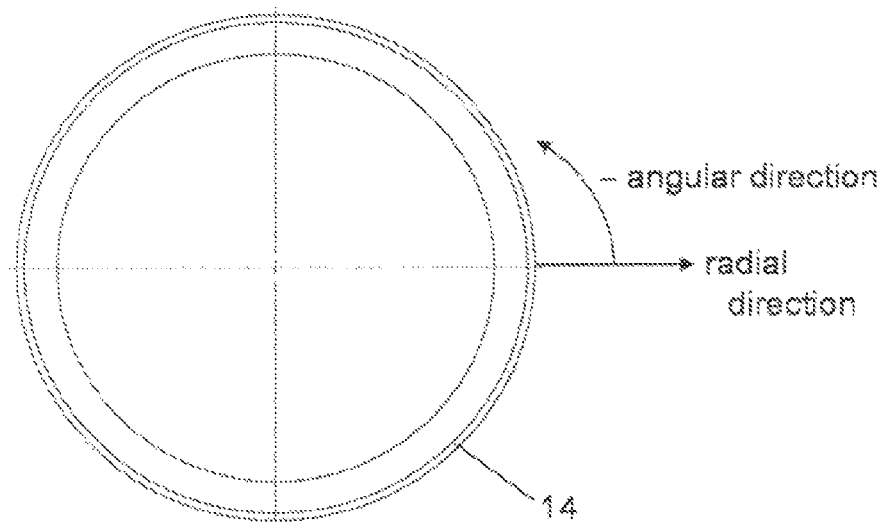
FIGS. 7A-C are top, perspective and cross-sectional views, respectively, of the cooking body of the pot according to FIG. 1.

As used herein, the terms "radial direction" and "angular direction" are used to refer to the angular and radial directions using polar coordinates originating at the center of the cooking body. This is particularly useful because the cooking utensils described herein will often be round pots and pans. For example, as shown in FIG. 7A, the radial direct is the direction extending away from the center of a pot or pan, while the angular direction relates to rotation around the center of a pot or pan at a fixed distance from the center. The intersection of the radial direction and the angular direction within a given plane, e.g., the horizontal plane, will be perpendicular to one another.

Figure 1:
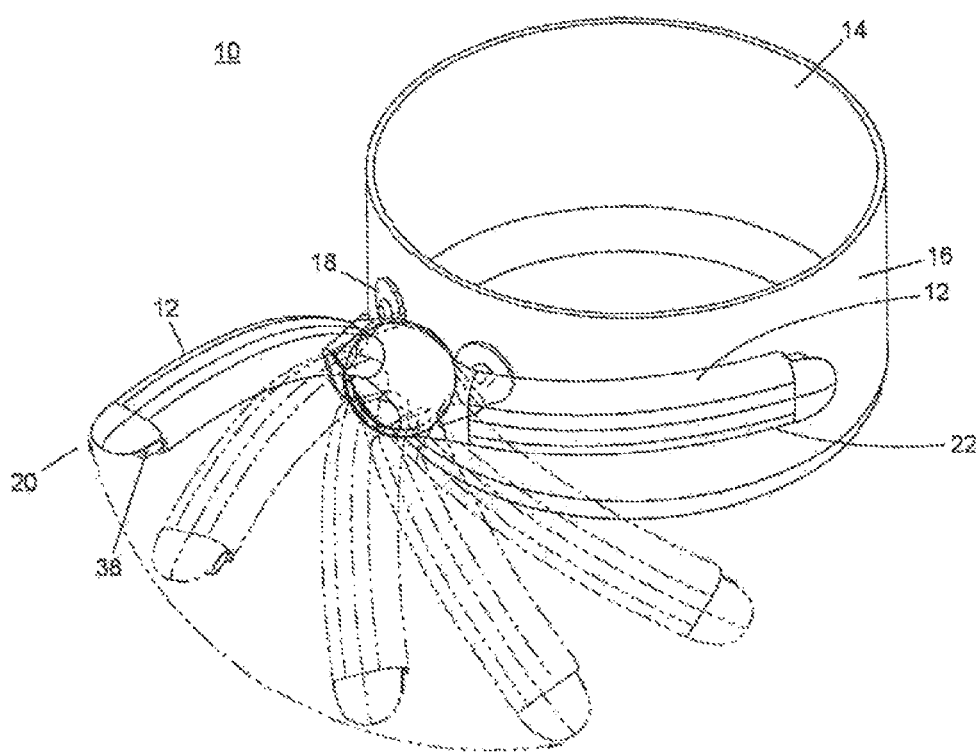
FIG. 1 is a perspective view of a pot including a handle according to one embodiment.

As shown in FIGS. 1-12, a cooking utensil 10 with a reconfigurable handle 12 is described. The cooking utensil 10 can include a cooking body 14 having an outer wall 16, and a mounting bracket 18 attached to the outer wall 16. As shown in FIG. 1, the handle 12 can be rotatably coupled to the mounting bracket 18 for rotating the handle 12 between a cooking position 20 where the handle 12 extends in a radial direction to a storage position where the handle 12 follows at least a portion of the outer wall 16.

Figure 6A:
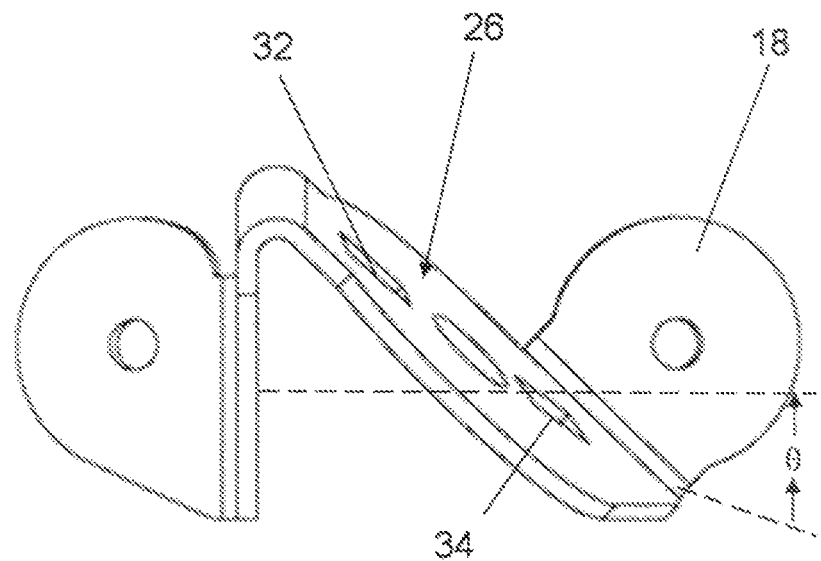
FIGS. 6A and 6B are views of the mounting bracket according to FIG. 1.
Figure 6B:
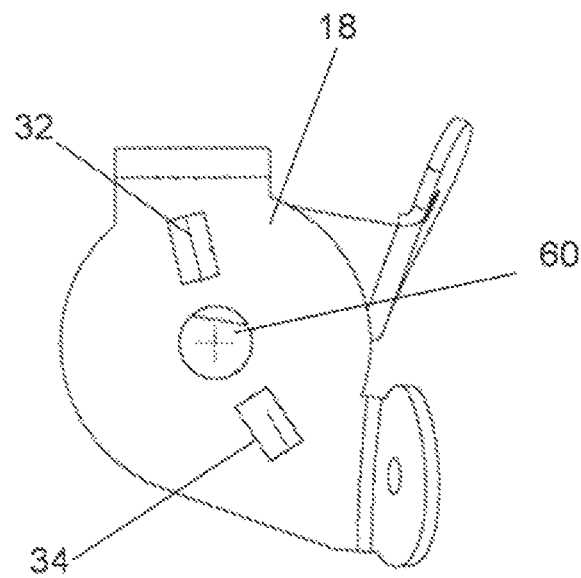
Figure 7B:
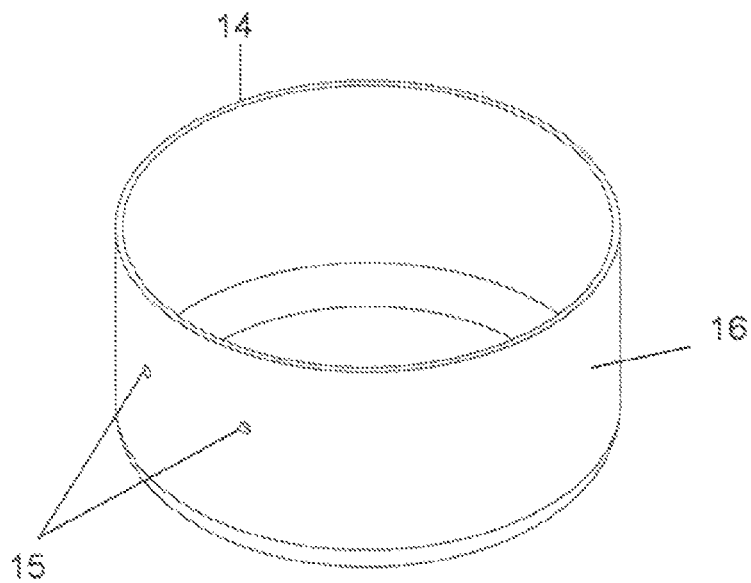
Figure 7C:
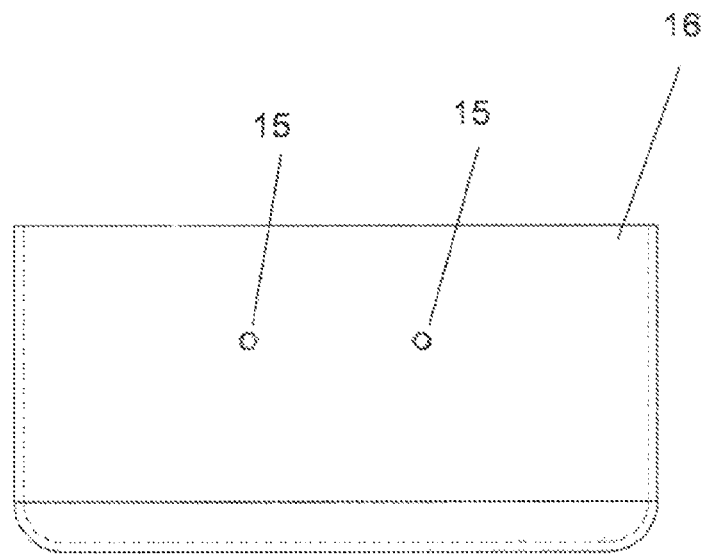
Figure 8A:
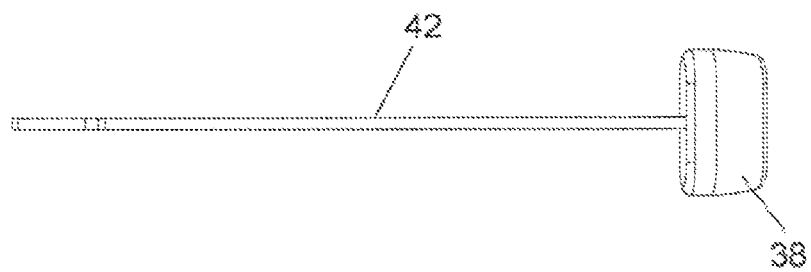
FIGS. 8A-F are a variety of views of the release actuator and release button according to FIG. 1.
Figure 8B:
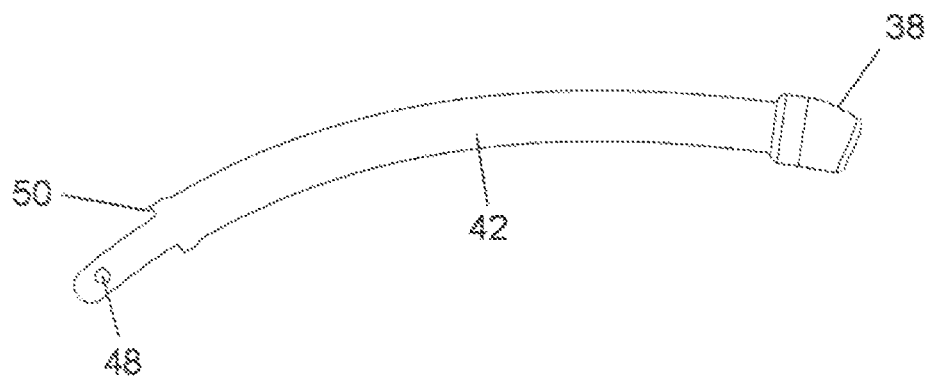
Figure 8C:
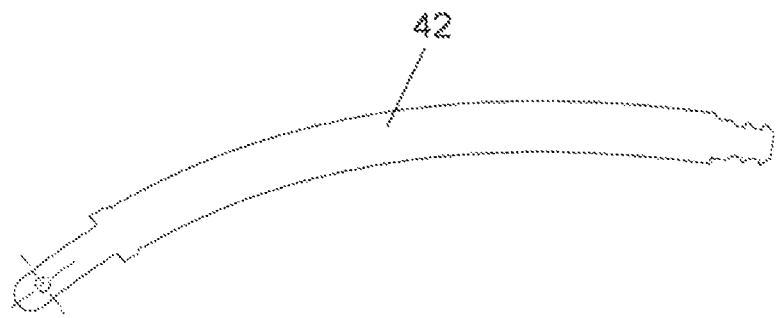
Figure 8D:
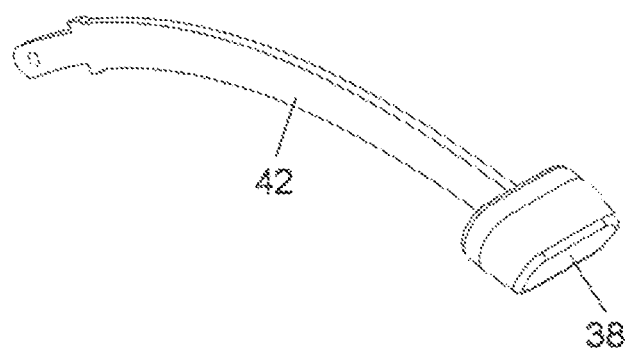
Figure 8E:
Figure 8F:
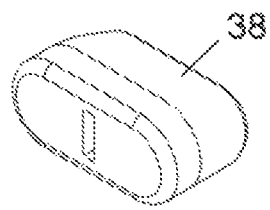
Figure 9A:
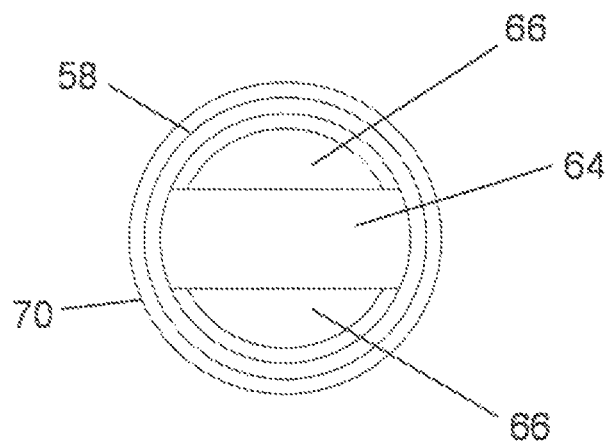
FIG. 9A is a top view of the rotation pin according to FIGS. 2-4.
Figure 9B:
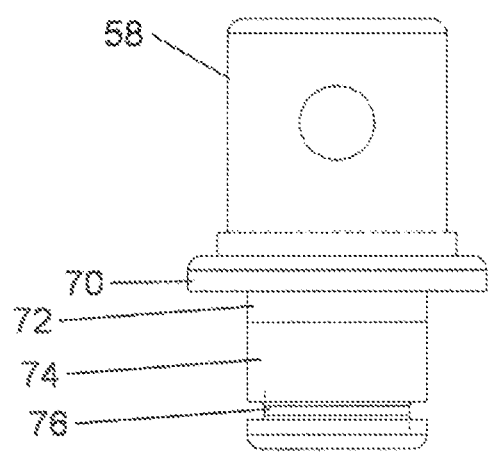
FIG. 9B is a side view of the rotation pin.
Figure 9C:
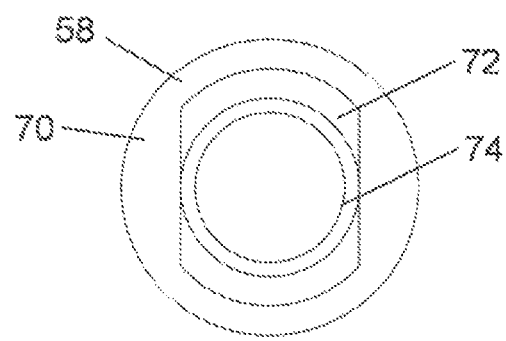
FIG. 9C is a bottom view of the rotation pin.
Figure 9D:
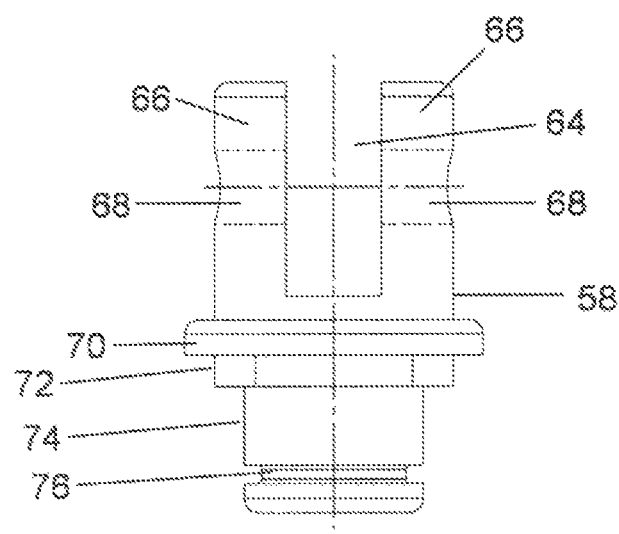
FIG. 9D is a front view of the rotation pin.
Figure 9E:
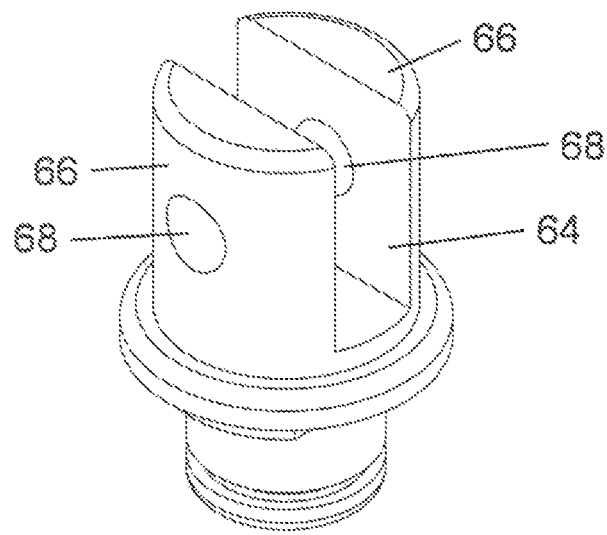
FIG. 9E is a top, perspective view of the rotation pin.
Figure 9F:
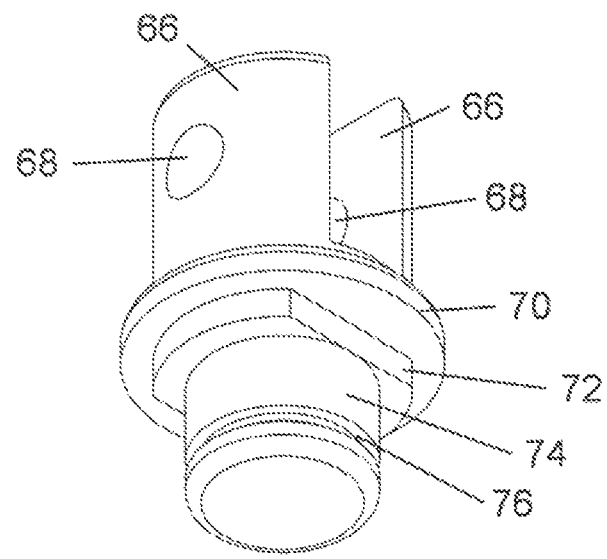
FIG. 9F is a bottom, perspective view of the rotation pin.
Figure 11:
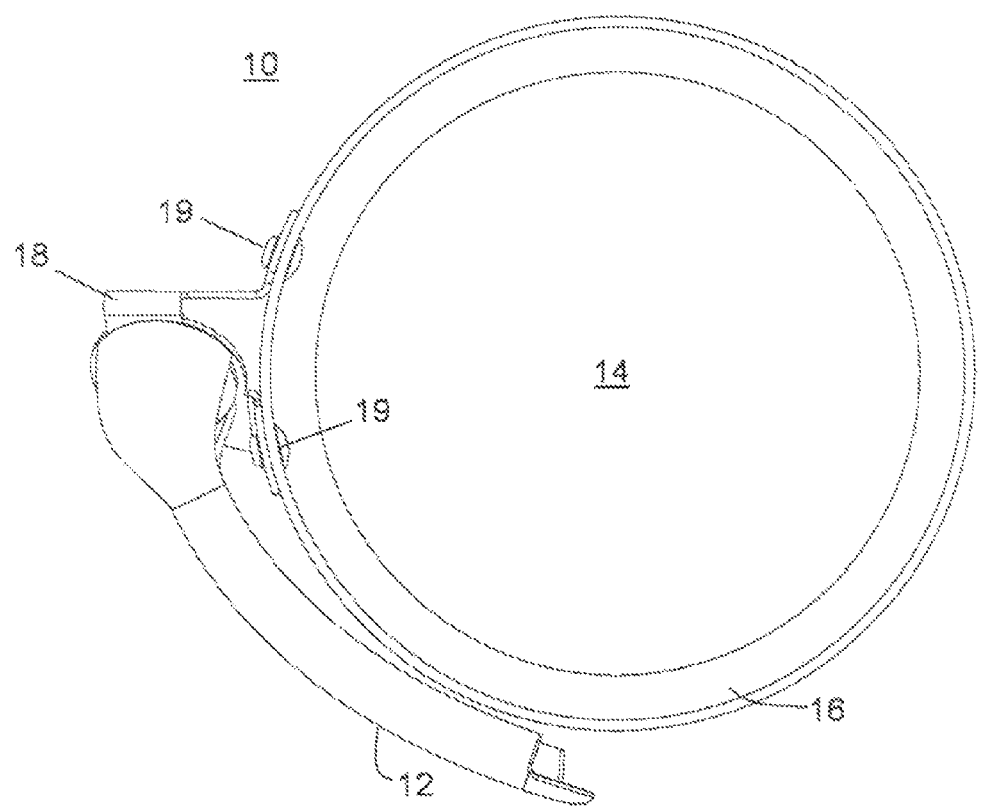
FIG. 11 is a top view of the pot according to FIG. 1 with the handle in the storage position.

The mounting bracket 18 can be permanently joined to the outer wall 16. For example, the mounting bracket 18 can include a pair of attachment openings 17 and the outer wall 16 can include a matching pair of attachment openings 15 as shown in FIGS. 6 and 7, respectively. As shown in FIG. 11, the mounting bracket 18 can be joined to the outer wall 16 with a pair of rivets 19 extending through the pairs of attachment openings 15, 17.

As shown in FIG. 1, the handle 12 can rotate continuously between the cooking position 20 and the storage position 22. The continuous movement causes the handle 12 to both pivot toward the outer wall 16 of the cooking body 14, but also causes the handle 12 to "rotate" such that the bottom 24 of the handle 12 faces toward the outer wall 16 when in the storage position 22, as in FIG. 11. It would be expected that this would require both a pivoting action and a separate rotating action. However, the movement between the cooking position 20 and the storage position 22 occurs in a single motion rather than a combination of multiple movements. This is much simpler for the user and is the result of the unique orientation of the axis of rotation of the mounting bracket 18 as described below. This also enables the handle to be securely locked in either the cooking position or the storage position.

The mounting bracket 18 can include a mounting surface 26 for mounting the handle 12 thereto. The handle 12 can include a base surface 28 for contacting the mounting surface 26. As shown in the Figures, the base surface 28 can be at a proximal end of the handle 12. The mounting surface 26 and the base surface 28 can be planar or generally planar. The base surface 28 and the mounting surface 26 can remain in contact with one another continuously as the handle 12 rotates between the cooking position 20 and the storage position 22.

As shown in FIG. 6, the outer wall 16 of the cooking body 14 can be curved (e.g., a pot or a pan). As shown in FIG. 11, the bottom portion of the handle 12 and/or the handle 12 itself can be curved such that the bottom of the handle 12 generally follows the outer wall 16 when the handle 12 is in the storage position 22.

Figure 2:
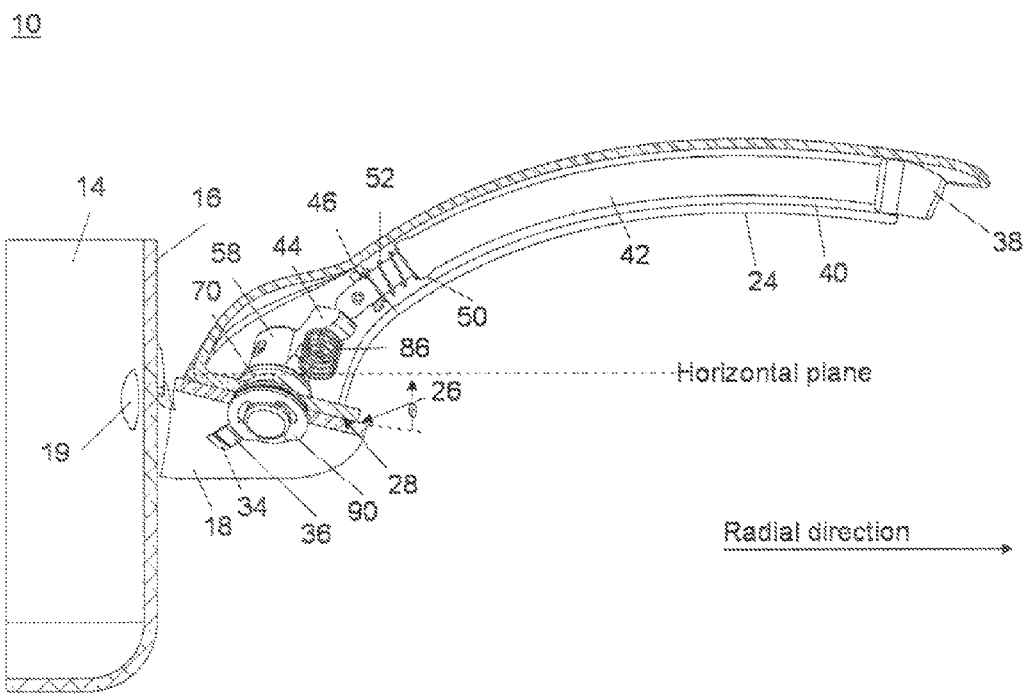
FIG. 2 is a cross-sectional view of the handle according to FIG. 1.

The base surface 28 and the mounting surface 26 can be tilted from horizontal along both an angular direction and a radial direction. As shown in FIG. 2, the mounting surface 26 can form an angle ($\theta$) of at least 2.5° with a horizontal plane along a radial direction, or at least 5° with a horizontal plane along a radial direction, or at least 7.5° with a horizontal plane along a radial direction. The mounting surface 26 can form an angle ($\theta$) of not more than 75° with a horizontal plane along a radial direction, or not more than 60° with a horizontal plane along a radial direction, or not more than 45° with a horizontal plane along a radial direction, or not more than 30° with a horizontal plane along a radial direction, or not more than 22.5° with a horizontal plane along a radial direction.

Figure 12:
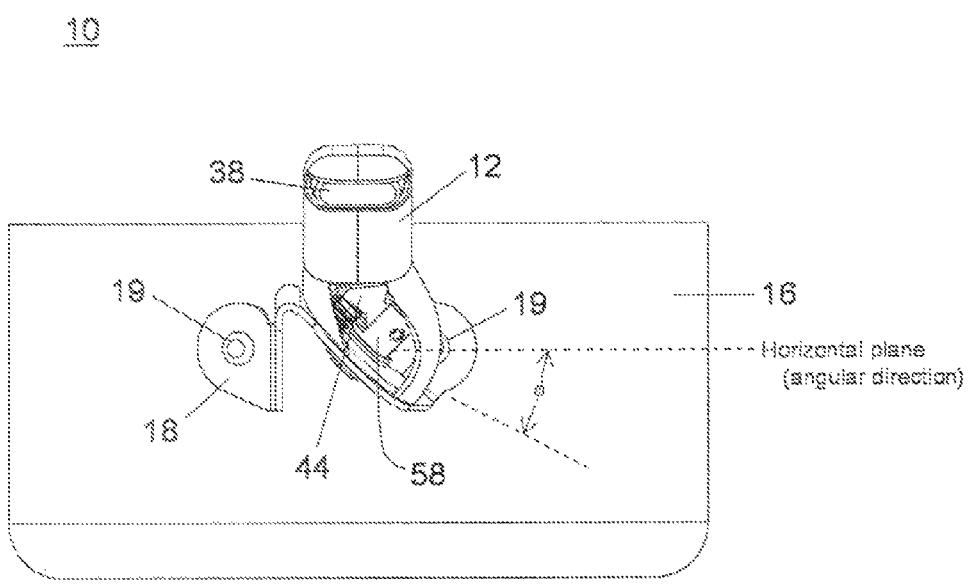
FIG. 12 is a front view of the pot according to FIG. 1 with the handle in the extended position.

As shown in FIG. 12, the mounting surface 26 can form an angle ($\phi$) of at least 15° with a horizontal plane along an angular direction, or at least 30° with a horizontal plane along an angular direction, or at least 37.5° with a horizontal plane along an angular direction. The mounting surface 26 can form an angle ($\phi$) of not more than 75° with a horizontal plane along an angular direction, or not more than 60° with a horizontal plane along an angular direction, or not more than 52.5° with horizontal plane along an angular direction.

The mounting surface can form an angle ($\theta$) of approximately 10° with a horizontal plane in a radial direction and an angle ($\phi$) of approximately 45° with a horizontal plane in an angular direction. Similarly, the base surface 28 can form complementary, but opposite angles to $\theta$ & $\phi$ for any of the examples or ranges listed above, relative to the horizontal plane so that the handle 12 is positioned appropriately in the cooking position 20 and the storage position 22.

The base surface 28 of the handle 12 can include a positioning opening 30, while the mounting surface 26 of the mounting bracket 28 can include a storage opening 32 and a cooking opening 34, as shown in FIGS. 5 and 6, respectively.

The positioning opening 30 can align with the cooking opening 34 when the handle 12 is in the cooking position 20. Similarly, the positioning opening 30 can align with the storage opening 32 when the handle 12 is in the storage position 22.

The cooking utensil 10 can also include a locking pin 36 adapted to (i) pass through the positioning opening 30 and extend into the cooking opening 34 when the handle 12 is in the cooking position 20, and (ii) pass through the positioning opening 30 and extend into the storage opening 32 when the handle 12 is in the storage position 22. The locking pin 36 can be biased so that it tends to extend into the cooking opening 34 or storage opening 36 when the positioning opening 30 is aligned with the respective openings 32, 34. When the appropriate openings are aligned (i.e., 30 and 32, or 30 and 34) and the locking pin 36 extends into the cooking or storage opening 32, 34, the locking pin 36 can prevent rotation of the handle 12 between the cooking position 20 and the storage position 22.

The cooking utensil 10 can also include a release button 38 exposed at a distal end of the handle 12. The release button 38 can be linked to the locking pin 36 so that when the release button 38 is depressed, the locking pin 36 is withdrawn from the storage opening 32 or the cooking opening 34 and the handle 12 can smoothly rotate between the cooking position 20 and the storage position 22.

The handle 12 can include an internal cavity 40 and the cooking utensil can also include a release actuator 42 coupled to the release button 38. As shown in FIG. 8, the release button 38 can be coupled to a distal end of the release actuator 42. As shown in FIG. 2, the release actuator 42 can extend within the internal cavity 40 toward a proximal end of the handle 12. The release actuator 42 can be adapted for causing the locking pin 36 to withdrawn from the storage opening 32 or the cooking opening 34 when the release button 38 is actuated (e.g., depressed).

Figure 3:
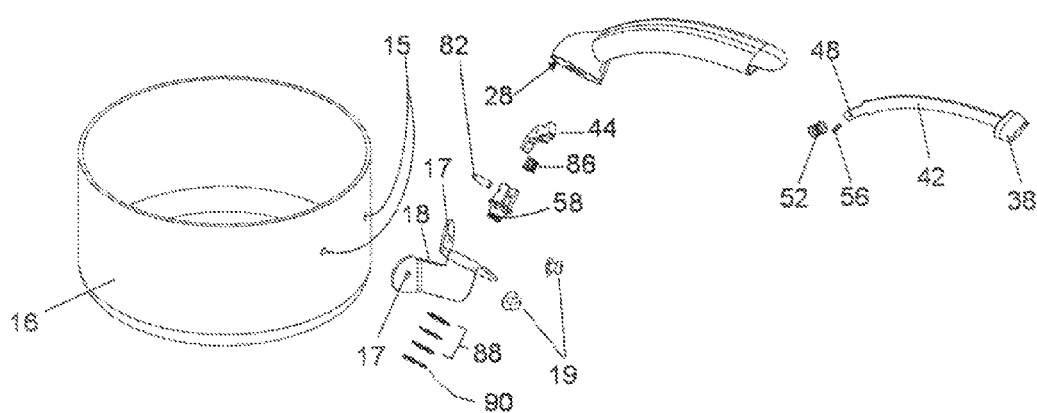
FIG. 3 is an exploded view of a pot and handle according to FIG. 1.

When assembled within the handle 12, the release actuator-release button assembly can be biased outward toward the distal end of the handle 12. In one design, the bias can be achieved using an actuator support 46 fixed proximate a proximal end of the internal cavity 40. As shown in FIGS. 2, 3 & 8, the proximal end of the release actuator 42 can include a pin opening 48 and a sprang shoulder 50 located radially outward from the pin opening 48. When assembled within the internal cavity 40, the proximal end of the release actuator 42 can pass through both an actuator spring 52 and the actuator opening 54 in the actuator support 46 (as shown in FIG. 5, Section C-C), while an actuator pin 56 can pass through the pin opening 48 to lock the assembly into place. The spring shoulder 50 can be positioned so that the actuator spring 52 exerts sufficient force to bias the release button 38 outward toward the distal end of the handle 12, but can be easily actuated by the user to rotate the handle between the cooking position 20 and the storage position 22.

Figure 4:
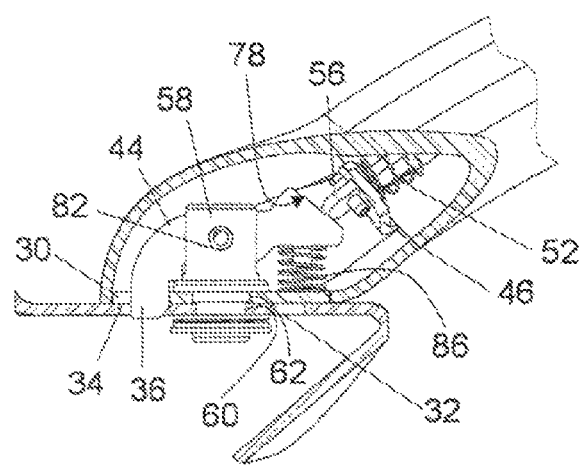
FIG. 4 is a cross-sectional view of the rotation, actuation system shown in FIG. 2.
Figure 5A:
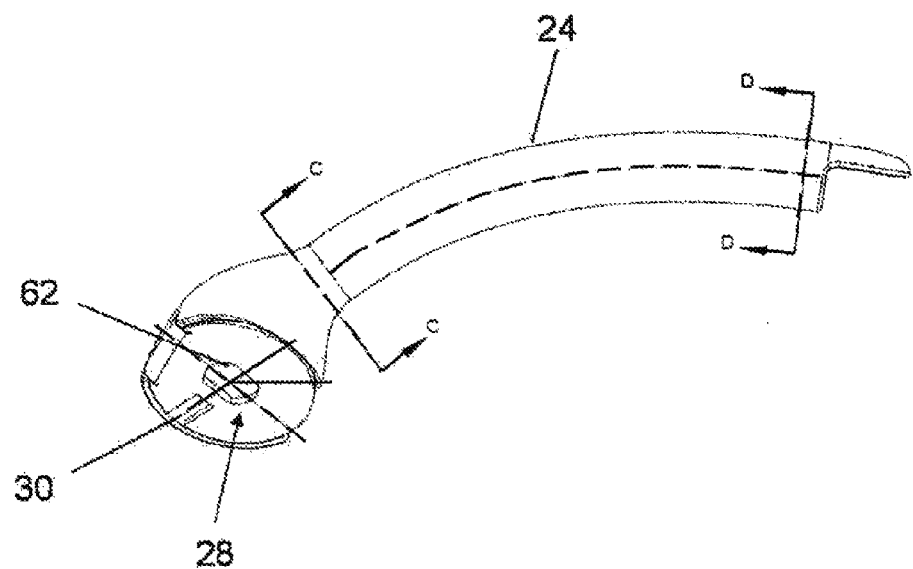
FIG. 5A is a perspective view of the handle according to FIG. 1.
Figure 5B:
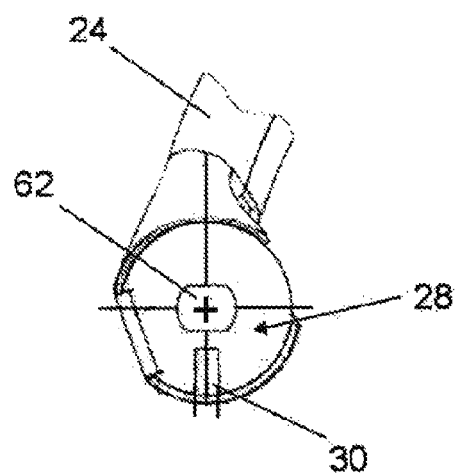
FIG. 5B is an end view of the handle.
Figure 5C:
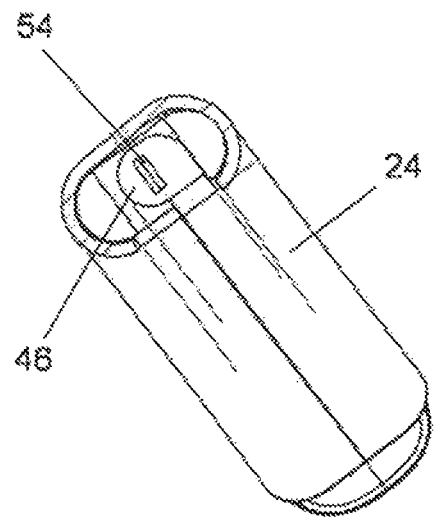
FIG. 5C is a cross-sectional view of the handle of FIG. 5A taken along cutline C-C.
Figure 5D:
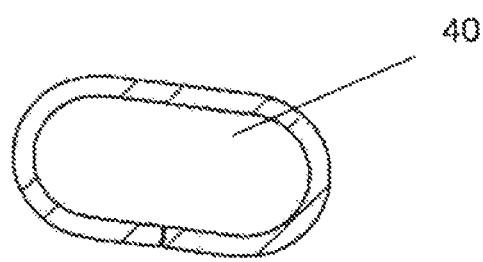
FIG. 5D is a cross-sectional view of the handle of FIG. 5A taken along cutline D-D.

The cooking utensil 10 can also include a stop lever 44 pivotably coupled to a rotation pin 58 within the internal cavity 40 of the handle 12. As shown in FIG. 4, the rotation pin 58 can pass through a rotation opening 60 in the mounting surface 26 and a locking rotation opening 62 in the base surface 28. The rotation opening 60 can be circular, while the locking rotation opening 62 can be non-circular.

As shown in FIG. 5, the locking rotation opening 62 can include at least two straight sides opposing one another. As shown in FIG. 9, the rotation pin 58 can include a locking protrusion 72 that locks with the locking rotation opening 62. Because of this locking relationship, the orientation of the rotation pin 58 (and anything, such as the stop lever 44, coupled to the rotation pin 58) relative to the handle 12 will remain constant as the handle 12 rotates between the cooking position 20 and the storage position 22.

As shown in FIG. 9, the rotation pin 58 can include an upper portion including a grove 64 for receiving a central portion of the stop lever 44. The rotation pin 58 includes supports 66 on each side of the grove 64. These supports can include a lever pin opening 68. Traveling from the bottom of the grove 64 to the bottom of the rotation pin 58, the rotation pin 58 can sequentially include a flange 70 with a diameter larger than the locking rotation opening 62, a locking protrusion 72 with a shape that fits securely within the locking rotation opening 62, and a cylindrical portion 74 that fits rotatably within the rotation opening 60. The bottom of the cylindrical portion can include a securing feature 76, such as the securing grove shown in FIG. 5.

As assembled, the upper portion of the rotation pin 58 can be within the internal cavity 40, while the cylindrical portion 74 and securing feature 76 can extend out of the internal cavity 40. The rotation pin 58 can be locked in place by placing one or more washers 88 and a locking collar 90 that fits (e.g., clips securely) into the securing feature 78 of the portion of the cylindrical portion 74 that extends through the rotation opening 60 and out of the handle 12.

Figure 10A:
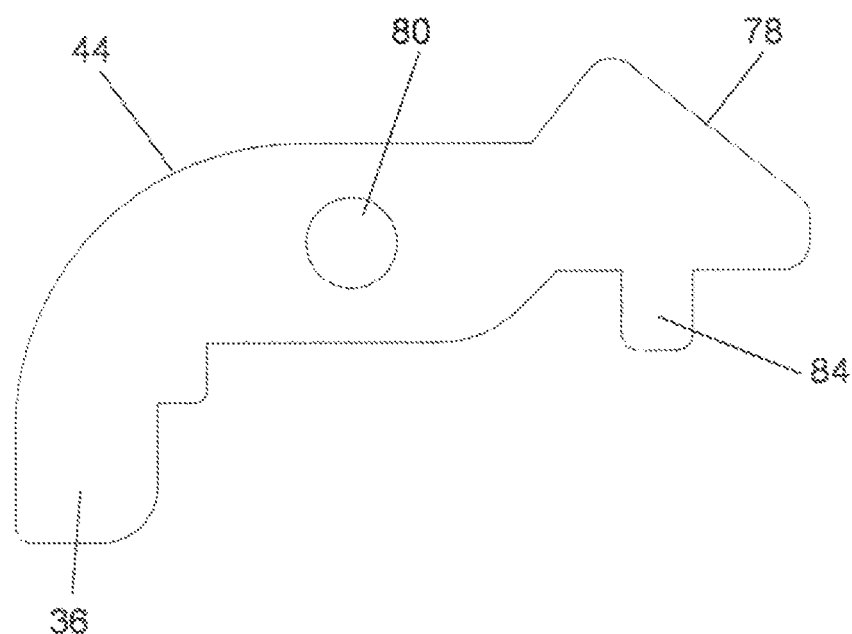
FIGS. 10A & 10B are a front view and a perspective view, respectively, of the stop lever according to FIGS. 2-4.
Figure 10B:
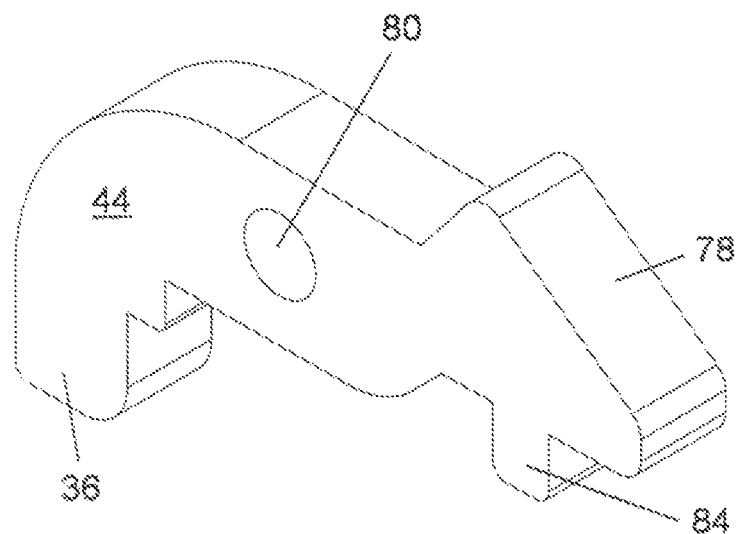

As shown in FIG. 10, the stop lever 44 can include the locking pin 36 at a first end and an actuation surface 78 at a second end opposite the first end. The stop lever 44 can have a central portion passing through the groove 64 of the rotation pin 58. The central portion of the stop lever 44 can include a pivot opening 80 and can be pivotably coupled to the rotation pin 58 by a lever pin 82 passing through the pivot opening 80 and the lever pin openings 68. The stop lever 44 can be located within the internal cavity 40 except for portions of the locking pin 36 that extend through the positioning opening 30.

In the assembled configuration, the locking protrusion 74 can fit securely within the locking rotation opening 62, such that the rotation pin 58 maintains a constant orientation with respect to the handle 12 and the release actuator-release button assembly even as the handle 12 rotates between the cooking position 20 and the storage position 22. Thus, regardless of the position of the handle 12, the stop lever 44 can be positioned so that when the release button 38 is depressed the proximal end of the release actuator 42 pivots the actuator surface 78 end of the stop lever down and causes the docking pin 36 to withdraw from the cooking opening 34 or the storage opening 32.

The stop lever 44 can be biased so that the locking pin 36 extends into the storage opening 32 or the cooking opening 34 when the openings 32, 34 are aligned with the positioning opening 30. The stop lever 44 can include a spring guide 84 on the actuation surface 78 side thereof that extends substantially parallel to the rotation pin 58. The spring guide 84 can extend through a first end of a biasing spring 86, which can have a second end contacting an interior portion of the base surface 28, as shown in FIG. 4.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A cooking utensil with reconfigurable handle, comprising:
   a cooking body having an outer wall;
   a mounting bracket attached to said outer wall; and
   an elongated handle rotatably coupled to said mounting bracket for rotating directly between:
   a cooking position where a major axis said handle extends in a radial direction from said outer wall and a bottom of said handle faces down; and
   a storage position where said handle follows at least a portion of said outer wall and the bottom of said handle faces the outer wall,
   wherein said mounting bracket comprises a mounting surface and said handle comprises a base surface for contacting said mounting surface,
   wherein said base surface and said mounting surface are tilted from horizontal along both an angular direction and a radial direction, and
   wherein the mounting surface forms an angle of 2.5° to 75° with a horizontal plane along an angular direction and the mounting surface forms an angle of at least 15° with a horizontal plane along a radial direction.

2. The cooking utensil according to claim 1, wherein said mounting bracket comprises a mounting surface, wherein said mounting surface forms an angle of 15° to 60° with a horizontal plane along an angular direction.

3. The cooking utensil according to claim 1, wherein said mounting surface is generally planar.

4. The cooking utensil according to claim 1, wherein said base surface and said mounting surface remain in contact continuously as the handle rotates between said cooking position and said storage position.

5. The cooking utensil according to claim 1, wherein said outer wall is curved and a bottom of said handle is curved such that said handle generally follows said outer wall when said handle is in said storage position.

6. The cooking utensil according to claim 1, wherein the handle follows the circumference of said outer wall.

7. A cooking utensil with reconfigurable handle, comprising:
   a cooking body having an outer wall;
   a mounting bracket attached to said outer wall; and
   an elongated handle rotatably coupled to said mounting bracket for rotating between:
   a cooking position where a major axis said handle extends in a radial direction from said outer wall and a bottom of said handle faces down; and
   a storage position where said handle follows at least a portion of said outer wall and the bottom of said handle faces the outer wall, wherein said base surface includes a positioning opening and said mounting surface includes a storage opening and a cooking opening, wherein (i) said positioning opening aligns with cooking opening when said handle is in said cooking position, and (ii) said positioning opening aligns with said storage opening when said handle is in said storage position.

8. The cooking utensil according to claim 7, further comprising a locking pin, wherein said locking pin can pass through said cooking opening when said handle is in said cooking position and can pass through said storage opening when said handle is in said storage position.

9. The cooking utensil according to claim 8, wherein said cooking utensil further comprising a release button exposed at a distal end of said handle, said release button for causing said locking pin to withdraw from said storage opening or said cooking opening so said handle can rotate between said cooking position and said storage position.

10. The cooking utensil according to claim 9, wherein said handle comprises an internal cavity, said cooking utensil further comprising a release actuator coupled to said release button, said release actuator extending within said internal cavity toward a proximal end of said handle said release actuator causing said locking pin to withdrawn from said storage opening or said cooking opening when said release button is depressed.

11. The cooking utensil according to claim 9, further comprising a stop lever pivotably coupled to a rotation pin, said rotation pin passing through a rotation opening in said mounting surface and a rotation opening in said base surface, said stop lever comprising said locking pin, said release actuator for pivoting said stop lever to withdrawn said locking pin from said cooking opening or said storage opening when said release button is actuated.

12. A cooking utensil with reconfigurable handle, comprising:
   a cooking body having an outer wall;
   a mounting bracket attached to said outer wall; and
   an elongated handle rotatably coupled to said mounting bracket for rotating between:
      a cooking position where a major axis said handle extends in a radial direction from said outer wall and a bottom of said handle faces down; and
      a storage position where said handle follows at least a portion of said outer wall and the bottom of said handle faces the outer wall, wherein said handle comprises an internal cavity, said cooking utensil further comprising a release button exposed at a distal end of said handle and a release actuator coupled to said release button extending within said internal cavity toward a proximal end of said handle.

13. The cooking utensil according to claim 12, further comprising a stop lever pivotably coupled to a rotation pin, said rotation pin passing through a rotation opening in said mounting surface and a rotation opening in said base surface, said stop lever comprising said locking pin, said release actuator for pivoting said stop lever to withdrawn said locking pin from said cooking opening or said storage opening when said release button is actuated.

\* \* \* \* \*